(12) United States Patent
Utter et al.

(10) Patent No.: US 12,063,068 B2
(45) Date of Patent: Aug. 13, 2024

(54) TRACKING SYSTEM

(71) Applicant: The Aerospace Corporation, El Segundo, CA (US)

(72) Inventors: Alexander Clifton Utter, Hawthorne, CA (US); Chang Lee, Yorba Linda, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 460 days.

(21) Appl. No.: 17/195,529

(22) Filed: Mar. 8, 2021

(65) Prior Publication Data

US 2021/0385388 A1 Dec. 9, 2021

Related U.S. Application Data

(63) Continuation-in-part of application No. 16/656,663, filed on Oct. 18, 2019, now Pat. No. 10,996,340.

(51) Int. Cl.
| | |
|---|---|
| *H04B 10/114* | (2013.01) |
| *G01S 1/70* | (2006.01) |
| *H04B 10/11* | (2013.01) |
| *H04B 10/116* | (2013.01) |

(52) U.S. Cl.
CPC ......... *H04B 10/116* (2013.01); *G01S 1/7038* (2019.08); *H04B 10/11* (2013.01); *H04B 10/114* (2013.01)

(58) Field of Classification Search
None
See application file for complete search history.

(56) References Cited

U.S. PATENT DOCUMENTS

| | | | | |
|---|---|---|---|---|
| 9,331,778 | B2* | 5/2016 | Iizuka | H04B 10/116 |
| 9,461,748 | B2* | 10/2016 | Pederson | F21K 9/20 |
| 9,655,189 | B2* | 5/2017 | Pederson | H05B 47/185 |
| 9,716,554 | B2* | 7/2017 | Iizuka | H04B 10/1129 |
| 9,762,320 | B2* | 9/2017 | Breuer | H04B 10/5563 |
| 9,838,119 | B1* | 12/2017 | Stein | G01S 3/7835 |
| 9,967,030 | B2* | 5/2018 | Pederson | H05B 47/195 |
| 9,997,070 | B1* | 6/2018 | Komanduri | H05B 47/195 |
| 10,027,412 | B2* | 7/2018 | Eroglu | H04B 10/502 |
| 10,075,234 | B2* | 9/2018 | Breuer | G01C 21/206 |
| 10,162,044 | B2 | 12/2018 | DeVaul et al. | |
| 10,168,417 | B2* | 1/2019 | Bulumulla | H04B 17/27 |
| 10,218,440 | B2* | 2/2019 | Cha | H04B 10/116 |
| 10,368,148 | B2 | 7/2019 | Kumar et al. | |
| 10,374,706 | B2* | 8/2019 | Pederson | G01S 1/7038 |

(Continued)

OTHER PUBLICATIONS

Kuo et al., Luxapose: Indoor Positioning with Mobile Phones and Visible Light, 2014 (Year: 2014).*

(Continued)

*Primary Examiner* — Jai M Lee
(74) *Attorney, Agent, or Firm* — LeonardPatel PC

(57) ABSTRACT

A tracking system includes one or more cameras and machine-vision processors configured to track the position of a plurality of optical tracking emitters. Each of the plurality of tracking emitters is modulated with a message. The message includes identification information for any of the plurality of tracking cameras receiving the message, so that the cameras can track the location of each emitter.

20 Claims, 12 Drawing Sheets

(56) References Cited

U.S. PATENT DOCUMENTS

| | | | | |
|---|---|---|---|---|
| 10,422,626 B2* | 9/2019 | Suzuki | | H04W 4/029 |
| 10,425,243 B2* | 9/2019 | Burger | | H05B 47/19 |
| 10,461,860 B2* | 10/2019 | Miras | | H04B 10/116 |
| 10,484,091 B2* | 11/2019 | Stout | | H04J 14/086 |
| 10,505,628 B2* | 12/2019 | Stout | | G01C 21/206 |
| 10,523,320 B2* | 12/2019 | Park | | H04B 10/116 |
| 10,547,383 B2* | 1/2020 | Jiang | | H04W 72/23 |
| 10,560,193 B2* | 2/2020 | Jang | | H04B 10/114 |
| 10,666,356 B2* | 5/2020 | Dong | | H04B 10/1149 |
| 10,911,144 B2* | 2/2021 | Pederson | | H04K 1/10 |
| 11,038,661 B1* | 6/2021 | Mondal | | H04L 5/0073 |
| 11,445,369 B2* | 9/2022 | Kwatra | | H04W 12/068 |
| 11,496,215 B2* | 11/2022 | Bendahan | | G08B 21/18 |
| 11,831,368 B2* | 11/2023 | Jiang | | G06V 40/103 |
| 2009/0052902 A1* | 2/2009 | Shinokura | | H04B 10/1143 |
| | | | | 398/118 |
| 2010/0097312 A1 | 4/2010 | Destura et al. | | |
| 2010/0129087 A1* | 5/2010 | Kim | | H04B 10/1149 |
| | | | | 398/182 |
| 2013/0271508 A1* | 10/2013 | Kaneko | | H04B 10/116 |
| | | | | 345/690 |
| 2013/0344899 A1 | 12/2013 | Stamm et al. | | |
| 2015/0280824 A1* | 10/2015 | Hong | | H04B 10/516 |
| | | | | 398/118 |
| 2016/0241348 A1 | 8/2016 | Zirwas et al. | | |
| 2017/0170906 A1* | 6/2017 | Holtman | | H04N 23/73 |
| 2020/0195343 A1* | 6/2020 | Solanki | | H04B 10/1143 |
| 2021/0226703 A1* | 7/2021 | May | | G06V 20/584 |

OTHER PUBLICATIONS

Yamazato et al., Image Sensor Based Visible Light Communication and Its Application to Pose, Position, and Range Estimations, The institute of Electronics, Information and Communication Engineers, 2014 (Year: 2014).*

Freshteh N Aghdam, "Notice of Allowance", issued Feb. 18, 2021, U.S. Appl. No. 16/656,663.

Freshteh N Aghdam, "Quayle Action", issued Dec. 21, 2020, U.S. Appl. No. 16/656,663.

Freshteh N Aghdam, "Restriction Requirement", issued Sep. 18, 2020, U.S. Appl. No. 16/656,663.

* cited by examiner

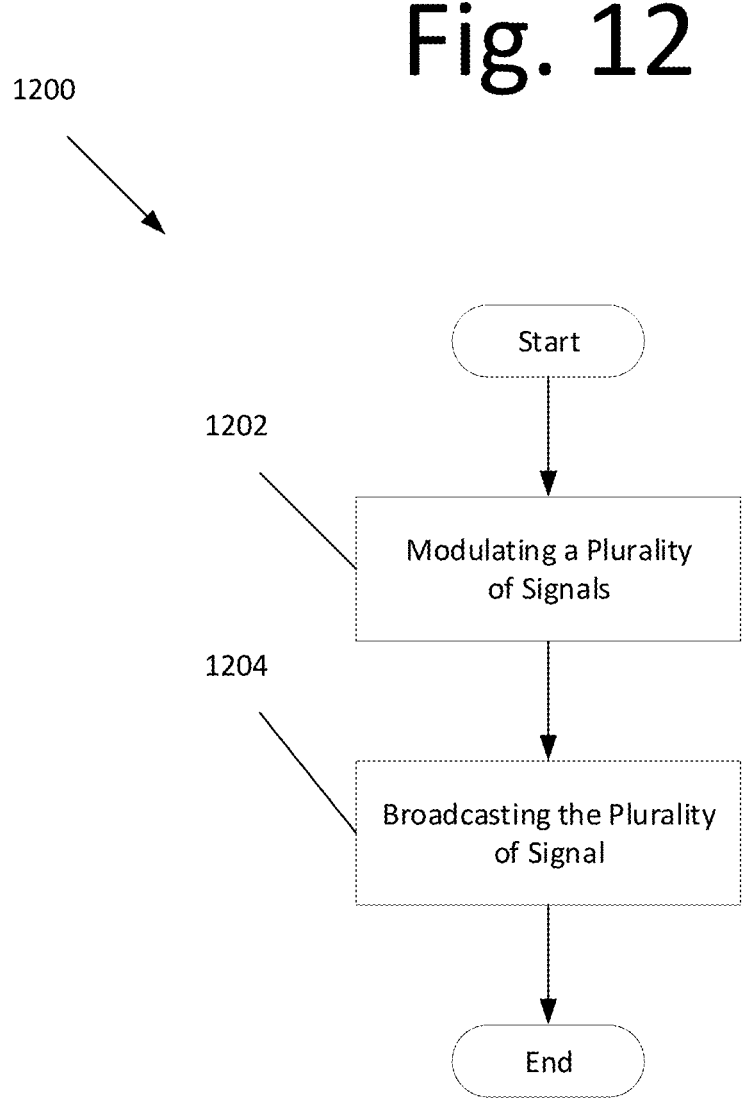

TRACKING SYSTEM

CROSS-REFERENCE TO RELATED APPLICATION

This application is a continuation in part (CIP) application of, and claims the benefit of, U.S. application Ser. No. 16/656,663, filed on Oct. 18, 2019. The subject matter thereof is hereby incorporated herein by reference in its entirety.

FIELD

The present invention relates to tracking systems, and more particularly, to a real-time position tracking system that provides location-based commands to one or more devices.

BACKGROUND

Positioning, tracking, and navigation all represent different facets of the same problem, i.e., determining one's location relative to some reference. Many systems use radio beacons. By sensing the direction and/or distance from a radio receiver to two or more beacons, the receiver can determine its location relative to those beacons. Broadly speaking, these techniques can be applied to beacons at fixed locations on the ground, as with the VHF Omni-Directional Range (VOR) navigation system for aircraft, or to beacons located on vehicles, including satellites, such as the Global Positioning System (GPS) or Galileo.

These systems vary widely in range, coverage, accuracy, and other performance parameters. However, all such radio-based positioning receivers have a relatively high size, weight, power, and cost.

Thus, an alternative real-time position tracking system is needed.

SUMMARY

Certain embodiments of the present invention may provide solutions to the problems and needs in the art that have not yet been fully identified, appreciated, or solved by current tracking systems. For example, some embodiments pertain to a real-time position tracking system.

In an embodiment, the real-time position tracking system includes one or more modulated projectors configured to broadcast a plurality of signals to a plurality of tracking receivers. Each of the plurality of signals is modulated with a message. The message includes positioning information for any of the plurality of tracking receivers receiving the message. The positioning information identifies a location of one or more the tracking receivers able to receive that message.

In another embodiment, a computer-implemented method for real-time position tracking includes modulating a plurality of signals with a message. The message includes positioning information for any of the plurality of tracking receivers receiving the message. The positioning information identifies a location of one or more tracking receivers able to receive that message. The method also includes broadcasting the plurality of signals from one or more modulated projectors to the plurality of tracking receivers.

In yet another embodiment, an apparatus includes one or more tracking cameras and a plurality of emitters. Each emitter contains one or more modulated light source(s). The one or more tracking cameras are connected to one or more machine vision processors that detect and track the emitters.

In another embodiment, an apparatus includes one or more tracking cameras, and a plurality of emitters, each of which contain a data source and a modulated light source. The one or more tracking cameras are connected to one or more machine vision processors that detects and tracks the emitters.

In yet a further embodiment, an apparatus includes an optical tracking system; and a plurality of light emitters, each of which includes a data source and a modulated light source. The data source generates a time-varying modulation signal uniquely identifying a corresponding one of the plurality of light emitters. The modulated light source emits a light in relation to the time-varying modulation signal to the optical tracking system.

In yet another embodiment, a system for performing real-time position tracking includes a plurality of trackers configured to receive a time-varying modulated signal identifying one of a plurality of emitters. Each of the plurality of trackers includes a plurality of tracking units configured to determine the time-varying modulated signal from the one of the plurality of emitters. Each of the plurality of trackers also include a plurality of demodulators configured to decode the time-varying modulated signal recovering an original bit-stream to identify the one of the plurality of emitters.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 12 is a flow diagram illustrating a method for providing location-based commands to one or more tracking receivers.

DETAILED DESCRIPTION OF THE EMBODIMENTS

Some embodiments pertain to a real-time position tracking system. In one example, the real-time position tracking system can be deployed in large open-air venues, such as concerts. One or more transmitters are mounted in fixed locations at the venue, and each ticket holder is issued an optical receiver. The position of each optical receiver can then be used for screening of valid ticket holders, data gathering for individual whereabouts over time, interactive light shows, text messaging to specific individuals or groups, and the like. Without loss of generality, some embodiments enables a wide class of location-based service applications.

Using large open-air venues as an example, the real-time position tracking system provides real-time position tracking of each optical receiver, as well as providing ID-based or location-based commands to each optical receiver located within the venue—potentially numbering in the tens of thousands. These optical receivers may be worn by individuals or attached to packages.

In another example, the transmitters can be mounted to a landing platform or space station, and a variety of smaller autonomous vehicles would each contain at least two small optical receivers. The optical receivers allow the vehicles to determine their position and orientation relative to transmitter beacons mounted to the larger platform, allowing those vehicles to accurately perform high-precision maneuvers such as docking or formation-flying. The present invention minimizes the size, weight, power, and cost of the optical receivers in each vehicle.

Figure 1:
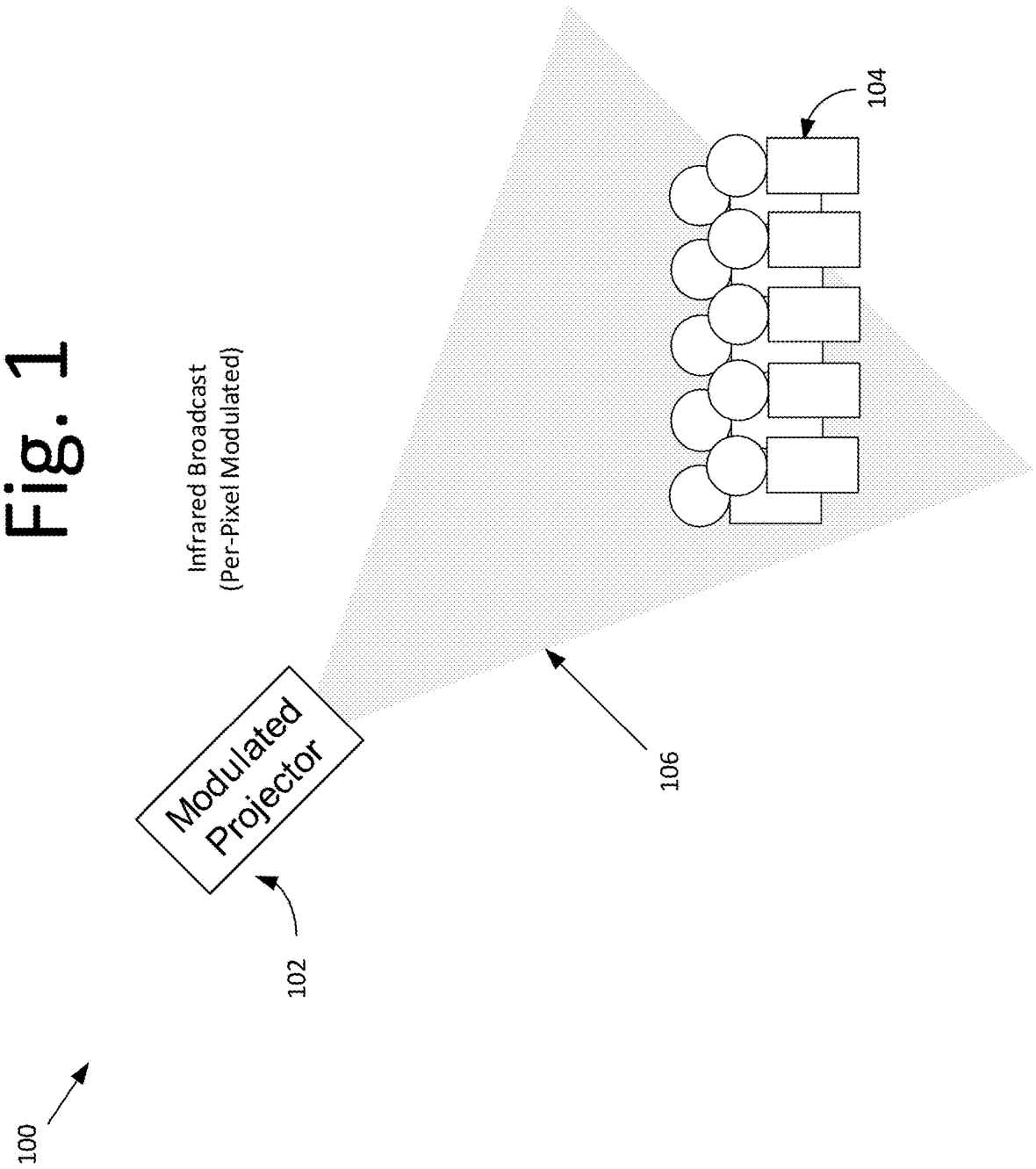
FIG. 1 is a block diagram illustrating a real-time position tracking system using a transmitter (which contains an optical projector) and a small, low-cost electronic optical receiver, according to an embodiment of the present invention.

FIG. 1 is a block diagram illustrating a real-time position tracking system 100 using a modulated optical beacon transmitter (hereinafter "transmitter" or "modulated projector") 102, an optical broadcast signal 106, and a plurality of small, low-cost position-determining optical receivers (hereinafter "optical receiver" or "optical receivers") 104, according to an embodiment of the present invention.

Figure 2:
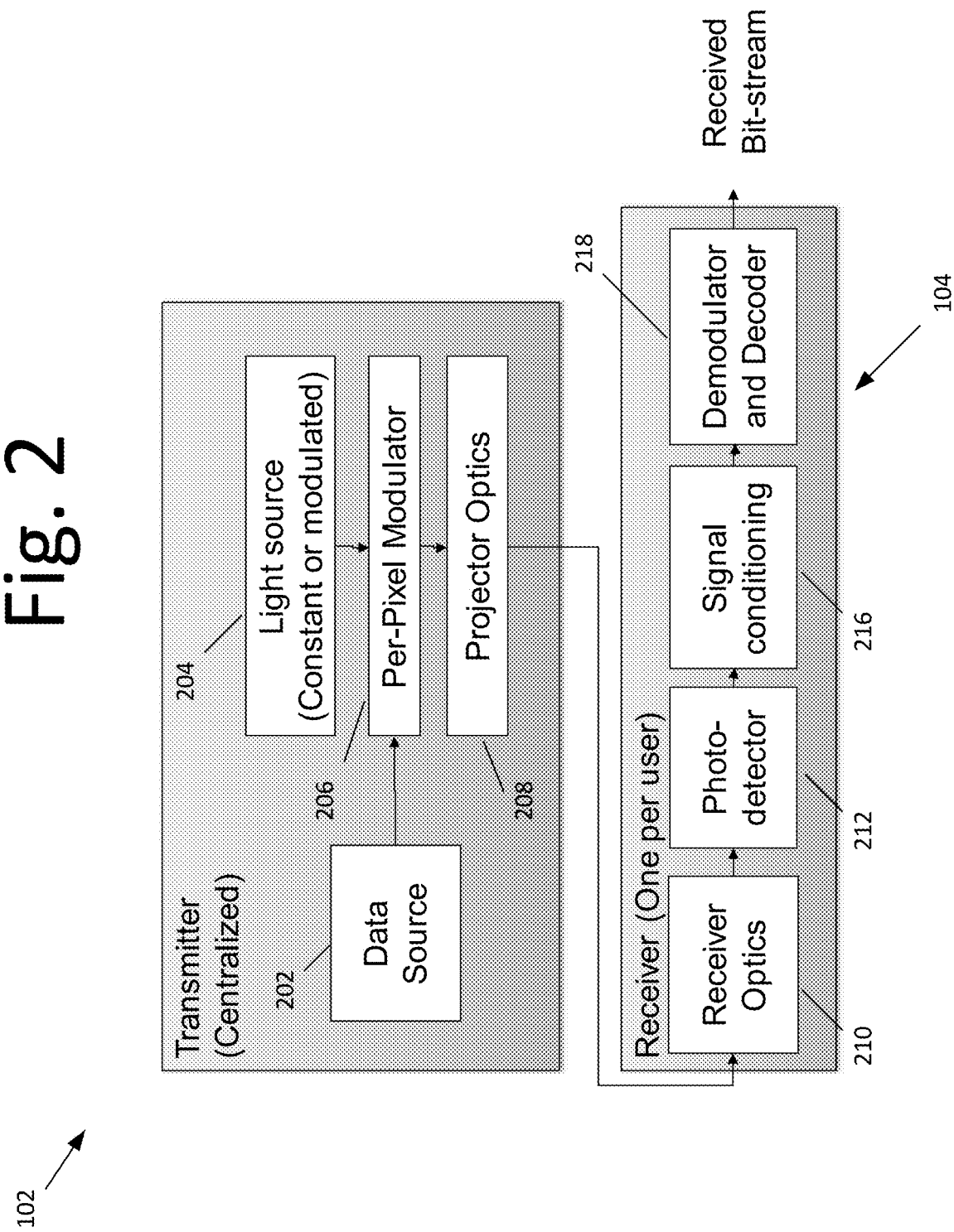
FIG. 2 is a block diagram illustrating the modulated optical beacon transmitter and the optical receiver, according to an embodiment of the present invention.

As shown in FIG. 2, transmitter 102 includes a data source 202, a light source 204, a per-pixel modulation device 206, and projector optics 208. The function of transmitter 102 is analogous to a commonly available video projector in some embodiments. In the simplest embodiment, light source 204 is constant, e.g., an incandescent bulb, a light-emitting diode, or any other device that produces light. The light source may be monochromatic in any wavelength (e.g., visible light, infrared, etc.) or broad-spectrum. Per-pixel modulator 206 controls the intensity of reflected or transmitted light within each spatial region (i.e., pixel) to form an output image. Each such image may be binary (i.e., each pixel solely black or white) or continuously variable (i.e., each pixel may be any intensity). The modulation function can be performed using a liquid crystal display (LCD) matrix, an array of micromirrors, or similar display devices known in the art. Data source 202 controls per-pixel modulator 206, commanding the modulator to set the intensity of each pixel at the appropriate time. Data source 202 may be self-contained, or it may accept inputs from an external source, not part of the embodiments discussed herein. Projector optics 208 contain optical elements such as lenses, mirrors, etc. that focus and project the modulated image at some distance in front of the projector.

In an embodiment, transmitter 102 may be implemented using a computer as data source 202 and a common video projector as the light source, modulator, and optics. Such an embodiment could readily send more than two million simultaneous signals (i.e., one signal for each of element of a pixel matrix with 1,920 columns and 1,080 rows), each signal modulated using on-off-keying (OOK) at a rate of 60 bits per second. Another embodiment, using a field-programmable gate array (FPGA) to directly control a micromirror array as its per-pixel modulator, could achieve per-signal OOK rates of more than 10 kilobits per second.

The light from transmitter 102 may be modulated with a carrier wave. The carrier wave allows the signal of interest to be readily distinguished from background sources (e.g., sunlight or fluorescent lights), which might otherwise interfere with successful reception. The simplest such carrier waves are simple alternating on-off square waves, typically at a fixed frequency circa 20-40 kHz, as is commonly used in television remote controls. Alternatively, the carrier wave could be a pseudorandom sequence, using either frequency-hopped or direct sequence spread spectrum (DSSS) techniques. This carrier modulation is independent of the wavelength of light source 204; it affects intensity only. The carrier modulation can be applied by strobing light source 204 itself, or by applying an additional modulation during the per-pixel modulation step.

The overall purpose of transmitter 102 is to emit a plurality of spatially multiplexed signals, each comprising a time-varying digital signal. Each such signal is generated by modulating a digital bit-stream that contains information intended for one or more optical receivers, as discussed in a later paragraph. The simplest possible modulation for each signal is on-off-keying (OOK), in which the presence of light in a fixed time-interval indicates a binary '1' and the absence of light indicates a binary '0'. However, many other modulations are possible as would be appreciated by a person of ordinary skill in the art. The signals will also benefit from additional encoding, including the addition of ambles, framing, checksums, forward error correction, etc.

Data source 202 assigns each such signal to a specific region in the projected image sequence, either on a one-to-one basis (one signal drives one pixel), on a one-to-many basis (one signal drives many pixels), or some combination (some signals drive one pixel each; others drive many pixels each). The end result is that transmitter 102 projects a sequence of images as directed by data source 202, where any given point in that image sequence can be interpreted as a time-varying signal. The entirety of the projected image sequence is considerably larger than any one optical receiver. In an embodiment, the aperture of each optical receiver 104 is sized such that it detects light from one or two spatially-adjacent pixels in the image sequence. As a result, each optical receiver 104 detects one signal out of the plurality of signals sent by transmitter 102.

Simply stated, with the multitude of signals that are sent, the position of any given optical receiver 104 determines which of these many signals is received. The broadcast nature of transmitter 102 means that any number of optical receivers 104 could lie in its field of view without affecting the function of the overall system.

An embodiment of a typical optical receiver 104 is shown in FIG. 2. Receiver optics 210 collect light from a defined aperture and focus the light on photodetector 212. In some embodiments, receive optics 210 may additionally contain filter(s) that selectively pass specific wavelength(s) and block others. This helps to prevent stray light from outside sources (e.g., sunlight, indoor lighting, etc.) from interfering with the signal of interest (i.e., the time-varying optical signal from the transmitter).

Photodetector 212 converts the received light intensity to an equivalent time-varying raw electrical signal. Signal conditioning circuitry 216 amplifies and filters the raw electrical signal to produce a filtered electrical signal. Such filters further reduce background interference and noise using matched-filters and carrier-wave removal. Finally, demodulator and decoder 218 demodulates and decodes filtered electrical signal. The result is a digital (or received) bit stream that is identical to one of the bit-streams created by the transmitter's data source 202.

To minimize optical receiver 104 component size and cost, some or all of the functions described above may be combined into a single integrated circuit. The required functions have much in common with receivers for ordinary television remote controls. As such, the entire optical receiver 104 (optics, photodetector, signal conditioning, and demodulator) could be implemented using a widely-available, low-cost integrated circuit. Alternate embodiments may use any combination of analog and digital circuitry.

The bit-stream output is typically sent to another device, not shown, which can then be used to perform any number of useful functions. In some embodiments, the bit-stream contains a multitude of information. For example, the bit-stream includes X and Y coordinates of the projector pixel containing that signal/bit-stream, as discussed below. The bit-stream may also contain commands or data intended for any optical receiver (i.e., sent as part of every signals), commands or data intended for a specific location (i.e., sent as part of specific signal(s)), commands or data intended for a specific receiver or group of receivers (i.e., prefixed with an identifying number).

If included in the received bit-stream, the X and Y coordinates provides optical receiver 104 a direct indication of its current location within the field of view of transmitter 102. This is because the locus of points able to receive any given time-varying optical signal forms a single line, i.e., a navigational bearing with respect to the transmitter. If the location of optical receiver 104 is constrained to a two-dimensional surface, whether flat or curved, then this bearing gives a direct location of its position in all dimensions. Otherwise, additional constraints are required to fully determine position.

To allow full three-dimensional positioning, to allow redundancy, or to allow overlapping coverage of complex areas, it may be beneficial to allow an optical receiver to simultaneously receive signals from multiple transmitters. Assuming the location of each transmitter is known, the X/Y navigational bearing to two separate transmitters allows full three-dimensional positioning. Similarly, attaching multiple optical receivers to a single rigid object allows the determination of the orientation of that object, in addition to its position.

Figure 3:
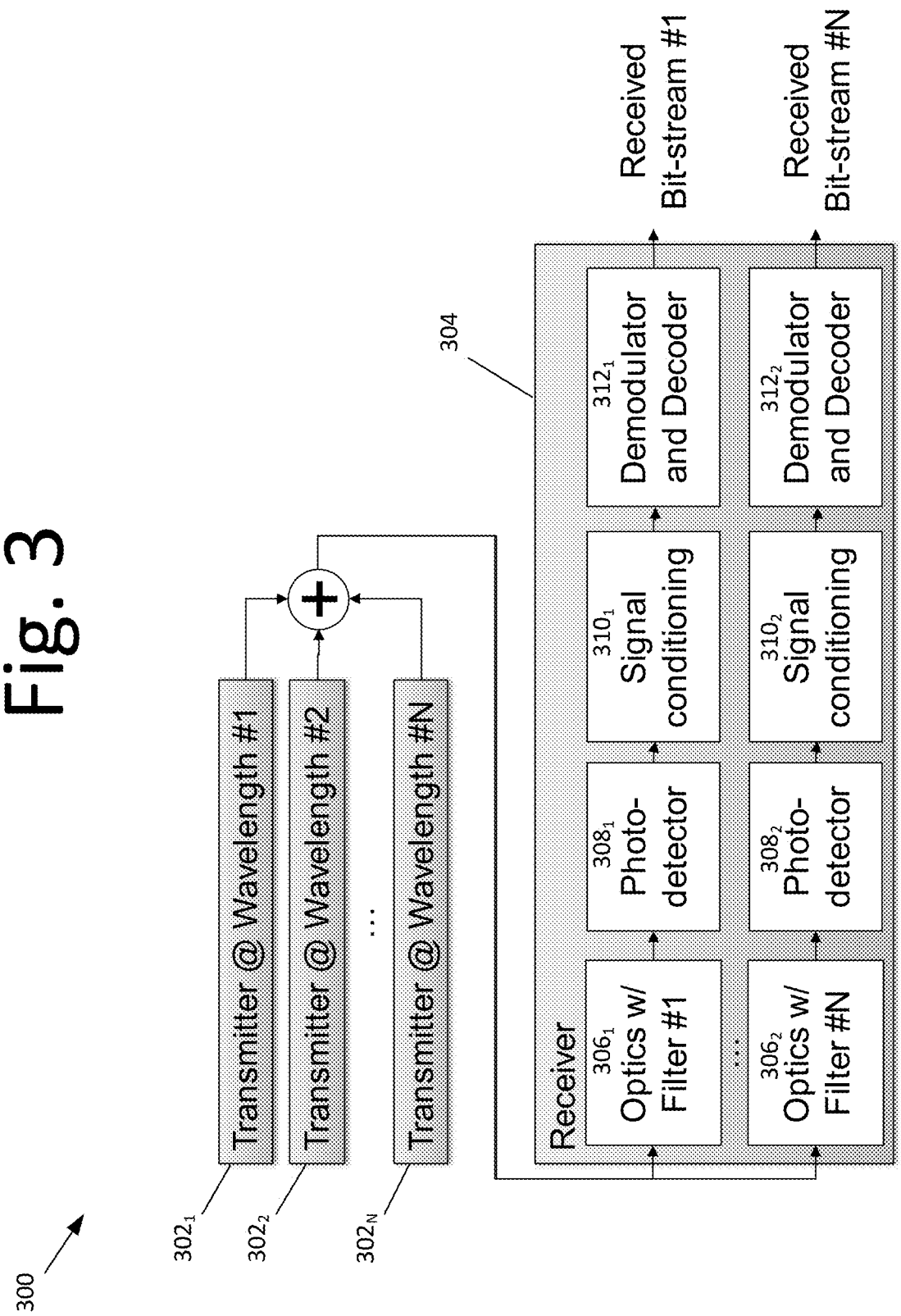
FIGS. 3 and 4 are block diagrams illustrating a real-time position tracking system with a multi-transmitters, according to an embodiment of the present invention.

An embodiment of a multi-transmitter is shown in FIG. 3. In this embodiment, the set of signals from each transmitter $302_1 \ldots 302_N$ are separated by using different wavelengths of monochromatic light. Each transmitter $302_1 \ldots 302_N$ contains a light source which emits at a specific wavelength, but is otherwise equivalent to FIG. 2. Similarly, each transmitter $302_1 \ldots 302_N$ may employ a wide-spectrum light source, but the actual projected wavelength may be time-interleaved via appropriate filtering, for example, via a color wheel. The projected wavelengths may be color mixed via assemblies of transmissive LCD panels and optics, enabling high order amplitude-keyed modulation and other techniques that would be otherwise appreciated by a person of ordinary skill in the art. In these embodiments, each optical receiver 304 contains multiple set of optics, each containing a filter $306_1 \ldots 306_N$ for a corresponding wavelength of light. In the simplest such embodiment, the entire optics, photodetector $308_1 \ldots 308_N$, signal conditioning circuits $310_1 \ldots 310_N$, and demodulator and decoder $312_1 \ldots 312_N$ chain is duplicated, with the only difference being the initial filter configuration. However, sharing of selected components is possible using various techniques known in the art.

Figure 4:
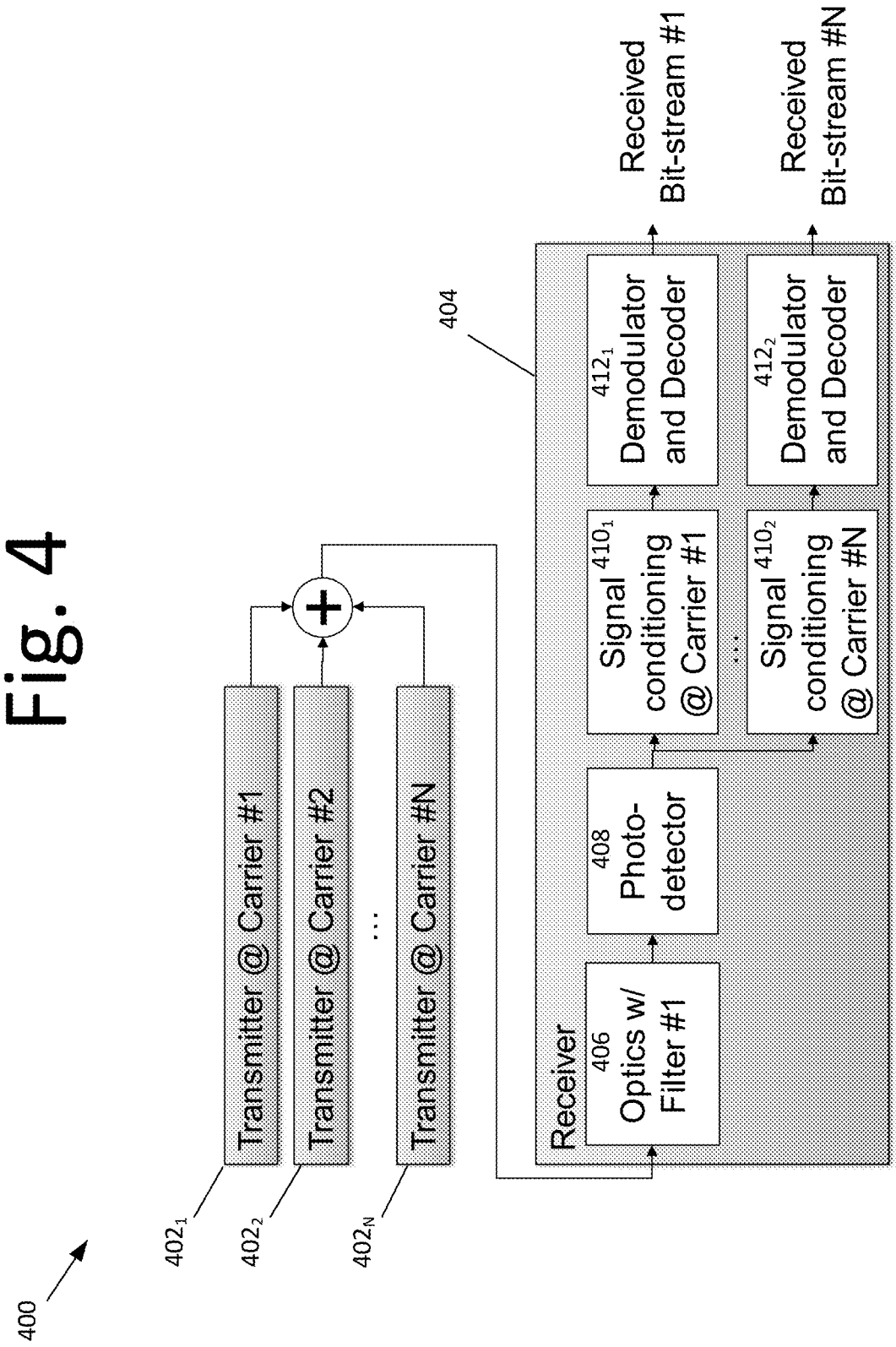

Another embodiment of the multi-transmitter is shown in FIG. 4. In this embodiment, each transmitter $402_1 \ldots 402_N$ uses a carrier wave similar to the embodiment discussed above with respect to FIG. 2, but at a different carrier frequency or a different DSSS sequence. Such signals remain orthogonal at the output of the photodetector 408, and can be separated by using a plurality of parallel signal conditioning circuits $410_1 \ldots 410_N$, each driving a separate demodulator and decoder $412_1 \ldots 412_N$. As with other multi-transmitter embodiments, the result is one received bit-stream for each transmitter in view. Note also that the wavelength and carrier-frequency techniques for multi-transmitter embodiments are not mutually exclusive and could be combined.

Figure 5:
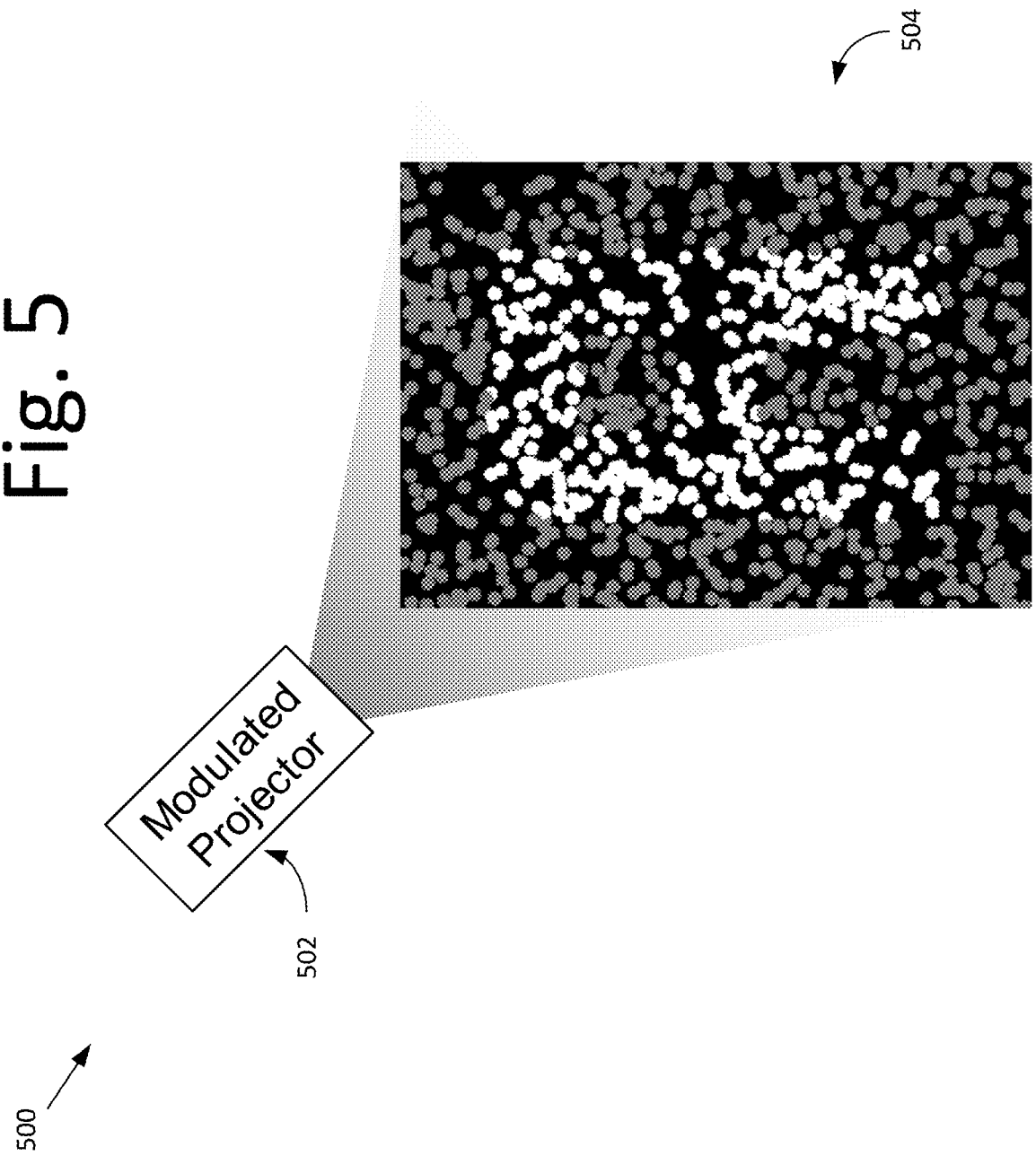
FIG. 5 is a diagram illustrating a real-time position tracking system using a plurality of optical receivers within a field of view, according to an embodiment of the present invention.

It should be appreciated that there may be a myriad of potential applications for the embodiments discussed herein. In one example, such as that shown in FIG. 5, hundreds of concert attendees (small dots) wearing wristbands are located within the field of view 504 of a ceiling-mounted transmitter 502. Each wristband contains an optical receiver attached to a programmable multicolor LED. By transmitting different commands to different regions, the LEDs for every wristband in each region can be commanded to a specific color. In FIG. 5, these colors and regions have been arranged so that, when viewed in the aggregate, the light from the plurality of wristbands forms the letter 'A'. Commands can be sent to change colors by region directly, or to activate pre-arranged sequences; either mode can be used to create complex light shows or even full-motion video displays.

Figure 6:
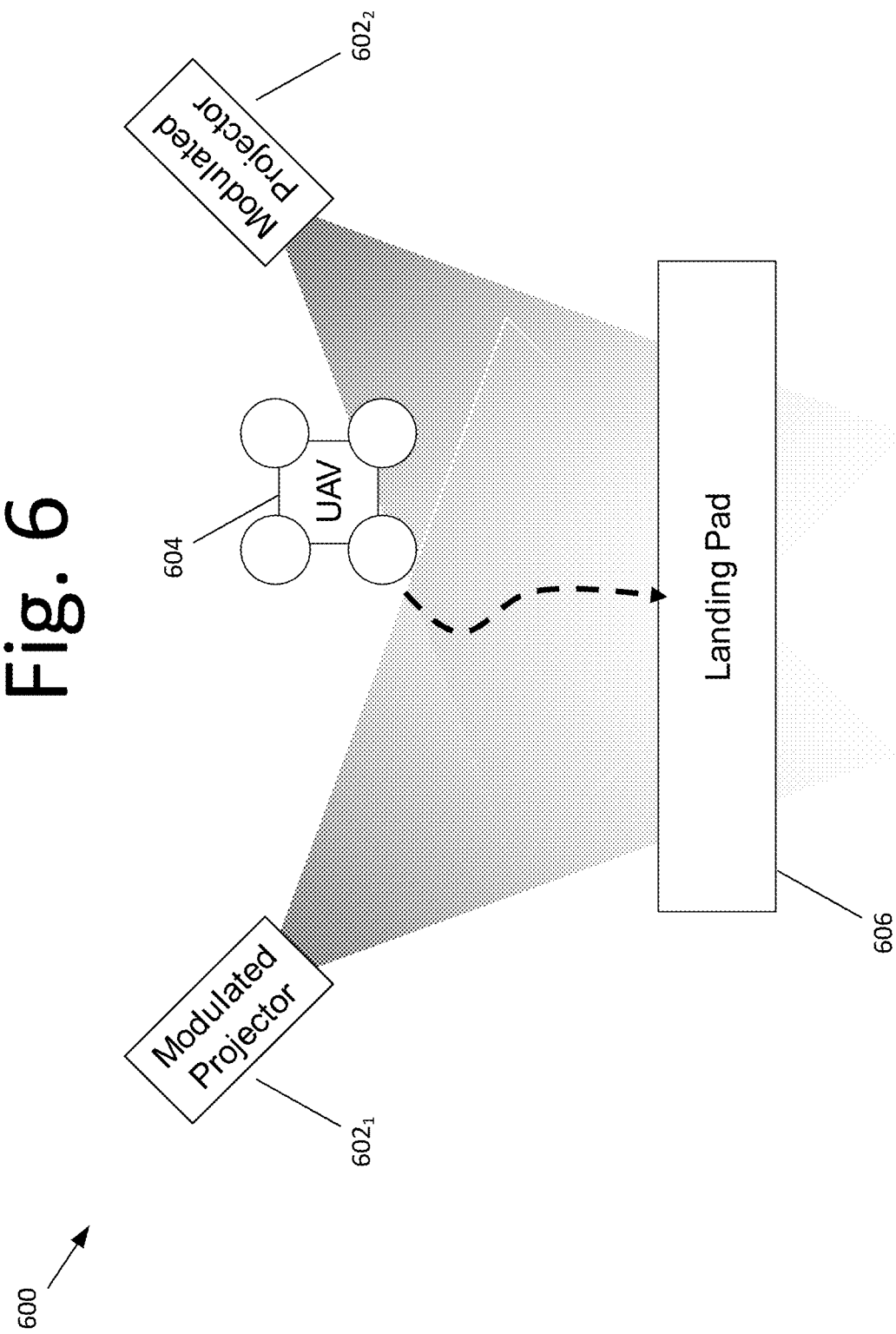
FIG. 6 is a block diagram illustrating a real-time positioning system use in conjunction with a landing pad, according to an embodiment of the present invention.

In another example, shown in FIG. 6, two transmitters (modulated projector) $602_1$ and $602_2$ are mounted near a landing pad 606. Their signals are made separable using techniques such as those described above with respect to FIGS. 2-4. An unmanned aerial vehicle 604, carrying an optical receiver, approaches landing pad 602 using a separate coarse navigation system (e.g., GPS), which is not accurate enough for a safe landing. However, once unmanned aerial vehicle 604 is in range of transmitters $102_1$ and $102_2$, unmanned aerial vehicle 604 switches to the optical receiver, yielding very precise position estimates relative to landing pad 602, which allows final navigation to a safe landing. Such a system could also be used for landing pads that are only approximately fixed in location, such as a barge or ship.

Figure 7:
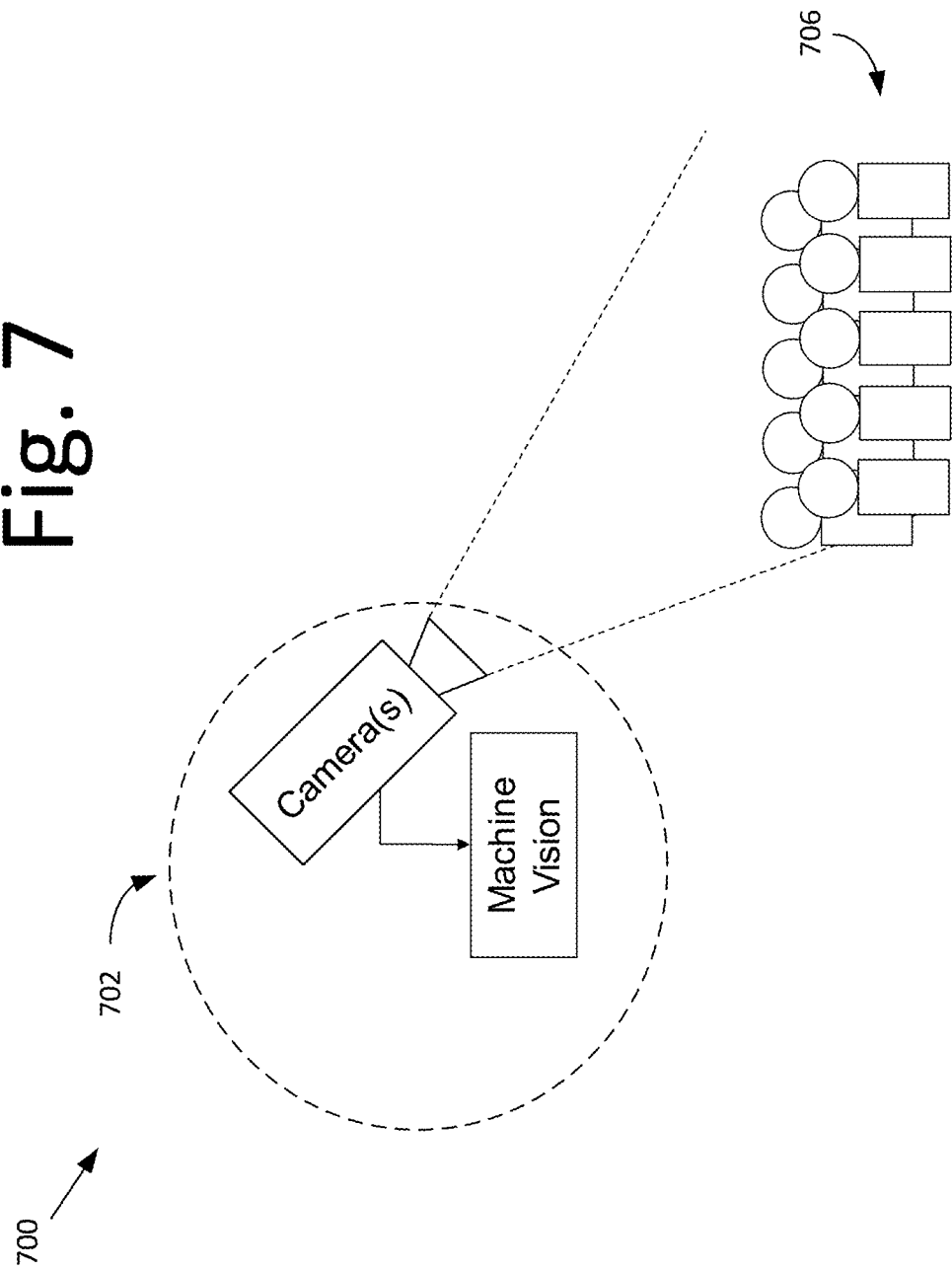
FIG. 7 is a block diagram illustrating a real-time position tracking system using an optical tracking system (hereinafter "tracker") and a plurality of optical tracking emitters 706 (hereinafter "emitter" or "emitters"), according to an embodiment of the present invention.

FIG. 7 is a block diagram illustrating a real-time position tracking system 700 using an optical tracking system (hereinafter "tracker") 702 and a plurality of optical tracking emitters 706 (hereinafter "emitter" or "emitters"), according to an embodiment of the present invention.

Figure 8:
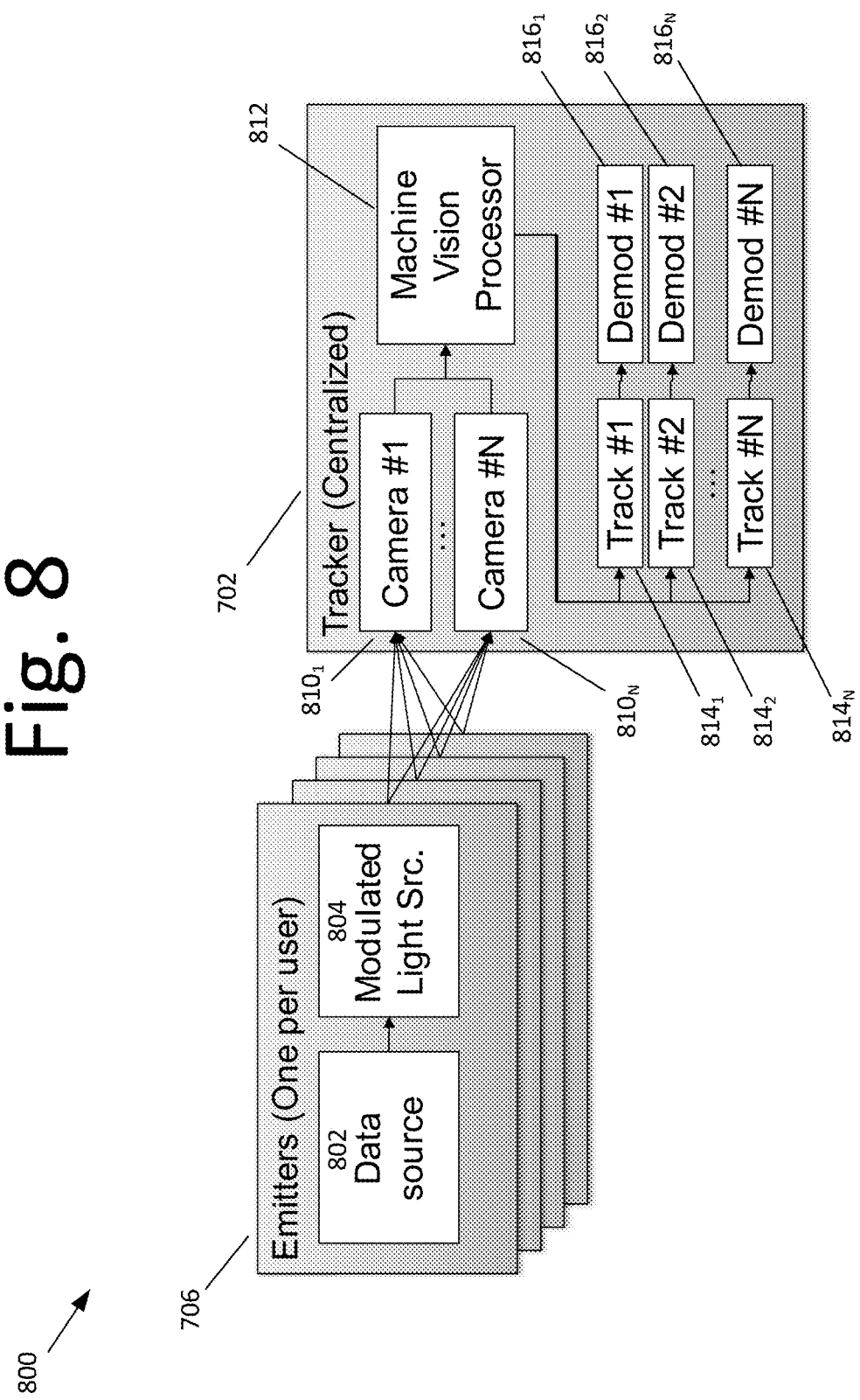
FIG. 8 is a block diagram illustrating emitters and a tracker of the real-time position tracking system, according to an embodiment of the present invention.

As shown in FIG. 8, each emitter 706 is comprised of a data source 802 and a modulated light source 804. In a typical embodiment, data source 802 is a low-cost microcontroller and modulated light source 804 is an infrared LED. Data source 802 generates a time-varying modulation signal that, at minimum, uniquely identifies emitter 706. If desired, data source 802 may also insert other telemetry, such as temperature or other sensor readings, into the same signal. Modulated light source 804 emits light in proportion to the modulation signal.

The overall purpose of emitter 706 is to emit a time-varying digital signal. The time-varying digital signal is generated by modulating a digital bit-stream containing information intended for one or more optical tracking systems 702, as discussed in a later paragraph. In an embodiment, modulation for each signal is performed by on-off-keying (OOK), in which the presence of light in a fixed time-interval indicates a binary '1' and the absence of light indicates a binary '0'. However, other modulations embodiments are possible as would be appreciated by a person of ordinary skill in the art. The time-varying digital signals also benefit from additional encoding, including the addition of ambles, framing, checksums, forward error correction, etc.

The light from each modulated light source 804 may be further modulated with a carrier wave. The carrier wave allows the signal of interest to be readily distinguished from background sources (e.g., sunlight or fluorescent lights), which might otherwise interfere with successful reception. The simplest carrier waves are simple alternating on-off square waves, typically at a fixed frequency circa 20-40 kHz, as is commonly used in television remote controls. Alternatively, the carrier wave could be a pseudorandom sequence, using either frequency-hopped or direct sequence spread spectrum (DSSS) techniques. The carrier modulation can be applied by strobing modulated light source 804.

Modulated light source 804 may further modulate the light or separate the light by wavelength. The modulated light may be emitted as a single wavelength, or may have a fixed set of wavelengths that can be modulated independently. Each of the plurality of emitters 706 may be configured to use a different wavelength or a different set of wavelengths. Any of these wavelength combinations may be further modulated using the carrier wave techniques described in the preceding paragraph.

In one embodiment, modulated light source 804 may be a cluster of three LEDs: one red, one green, and one blue. Each LED is modulated using a 20 kHz carrier wave, then further modulated with a bit-stream that uniquely identifies emitter 706 and transmits the current temperature.

To minimize emitter 706 component size and cost, some or all of the functions described above may be combined into a single integrated circuit. The required functions have much in common with transmitters for ordinary television remote controls. As such, emitter 706 (i.e., the data source and modulated light source) may be implemented using a widely-available, low-cost integrated circuit. Alternate embodiments may use any combination of analog and digital circuitry.

Also, as shown in FIG. 8, tracker 702 contains one or more camera(s) $810_1 \ldots 810_N$, each of which may include wavelength-selective filter(s) to better detect the emitters. Camera(s) $810_1 \ldots 810_N$ are arranged to provide adequate coverage over a pre-determined area of interest. Each camera $810_1 \ldots 810_N$ feeds a video signal to a software-based machine vision processor 812. The emitters are visible as moving and flickering points of light in these video signals(s). Machine-vision processor 812 detects these points of light and enables a plurality of tracking units $814_1 \ldots 814_N$ to follow their motion over time. Tracking units $814_1 \ldots 814_N$ determine the time-varying intensity for each point, which corresponds to the time-varying digital signal(s) from the emitter. A plurality of demodulators $816_1 \ldots 816_N$, one for each tracker, decode the time-varying digital signal(s) from that emitter to recover the original digital bit-stream.

The bit-stream output is typically sent to another device, not shown, which can then be used to perform any number of useful functions. The bit stream contains the identity of the emitter and may contain additional embedded data.

In addition to the bit-stream, the tracker units $814_1 \ldots 814_N$ also determine the current location of each tracked emitter within the field of view of each input camera $810_1 \ldots 810_N$. For an embodiment with a single camera, this corresponds to the X and Y coordinates of each tracked emitter 706. If the location of each emitter 706 is constrained to a two-dimensional surface, whether flat or curved, then this bearing gives a direct location of its position in all dimensions. Otherwise, additional constraints are required to fully determine position. To allow full three-dimensional positioning, to allow redundancy, or to allow overlapping coverage of complex areas, it may be beneficial to add additional cameras. Assuming the location of each camera is known, the X/Y navigational bearing to two separate emitters allows full three-dimensional positioning. Similarly, attaching multiple emitters to a single rigid object allows the determination of the orientation of that object, in addition to its position.

If there are many rapidly-moving emitters, tracking them may be very difficult, especially if they may be occluded intermittently. Use of amplitude modulation, instead of on-off-keying, can be structured to ensure the emitter's light intensity is never zero, making it easier to maintain a continuous position lock on each emitter's changing location within the video stream. The amplitude modulation could be two-level (e.g., 50%, 100% intensity) to encode one bit per time interval, or multi-level (e.g., 25%, 50%, 75%, 100%) to encode multiple bits per time interval. For implementations with emitters deployed with two or more wavelength light sources, higher order modulation may be employed to further link throughput, improve positioning timeliness, optimize for other desired system characteristics, and combinations thereof.

The tracking task can be further eased by mitigating as much background interference as possible in the area of interest. As a result, most embodiments are likely to use narrowband infrared light sources in each emitter and corresponding filters on each camera. The task may be further eased by using very high camera frame rates to minimize the effective frame-to-frame motion. For purposes of simplicity, details of the machine vision processor and tracking system, while very complex, are not described herein.

Figure 9:
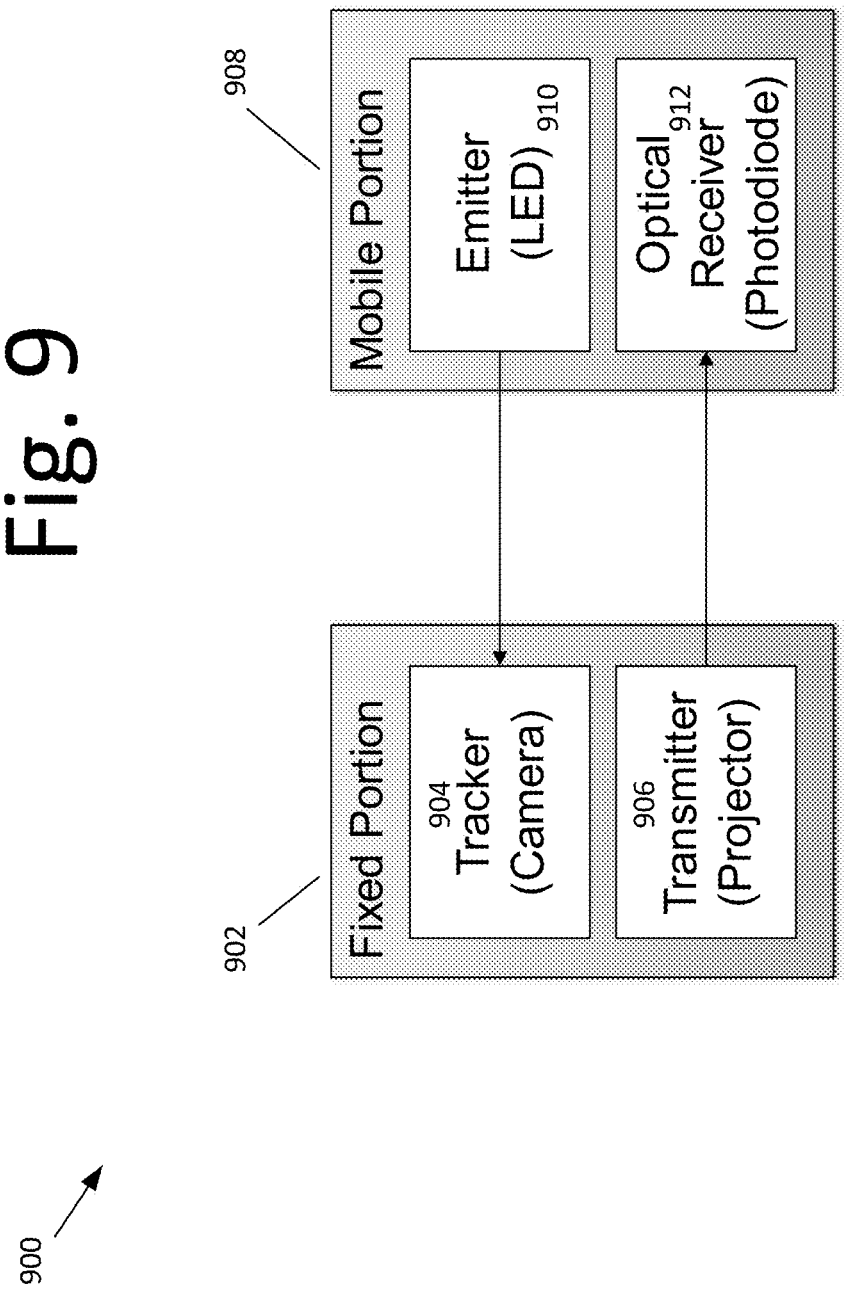
FIGS. 9-11 are blocks diagram illustrating a fixed portion and a mobile portion of the real-time position tracking system, according to an embodiment of the present invention.

A system may incorporate the transmitter/receiver and emitter/tracker embodiments in isolation or in arbitrary combination thereof. See, for example, FIG. 9, which illustrates an embodiment that incorporates both transmitter (modulated projector) 906 and tracker (camera) 904 on the fixed portion 902, and incorporate a receiver 912 (photodiode) and emitter 910 (LED) on the mobile portion 908. Such an implementation enables concurrent, multi-channel bidirectional data links between the fixed portion and the mobile portion. This enables new classes of applications dependent on such capabilities, e.g., position enhanced data mining, geofencing, emitter population subset singulation, etc.

Figure 10:
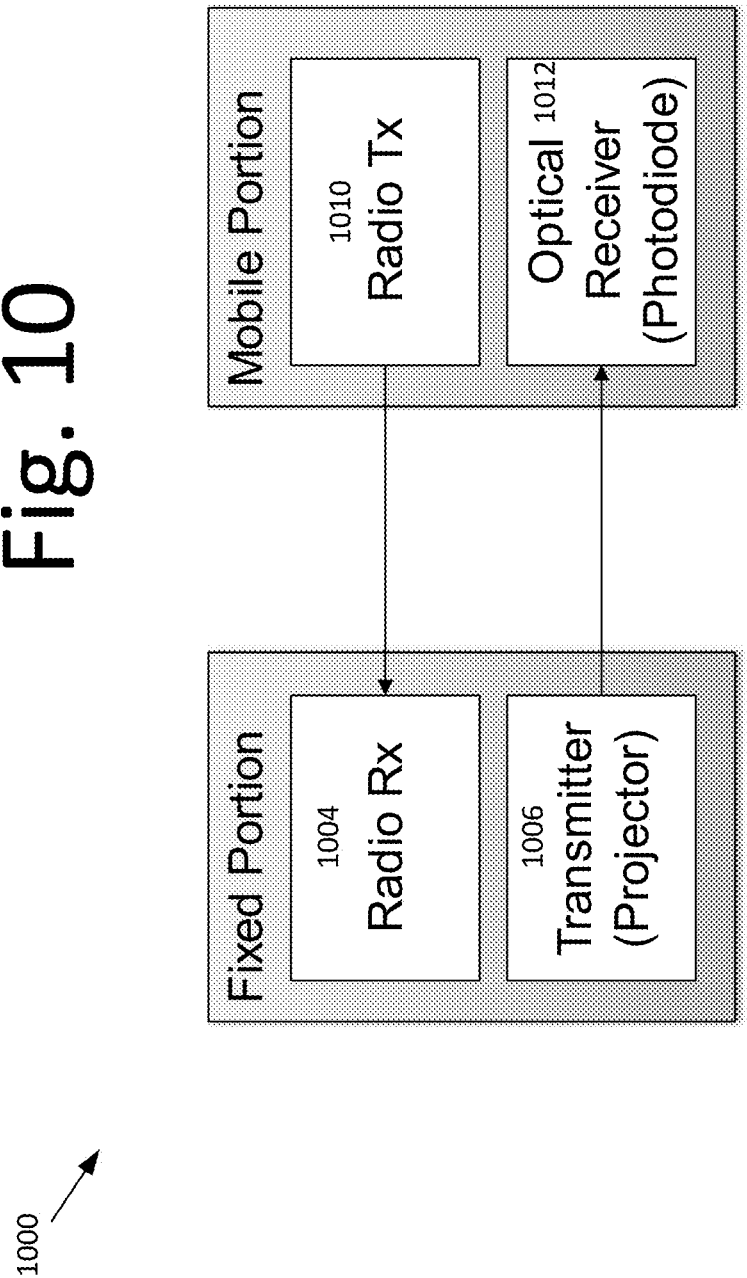
Figure 11:
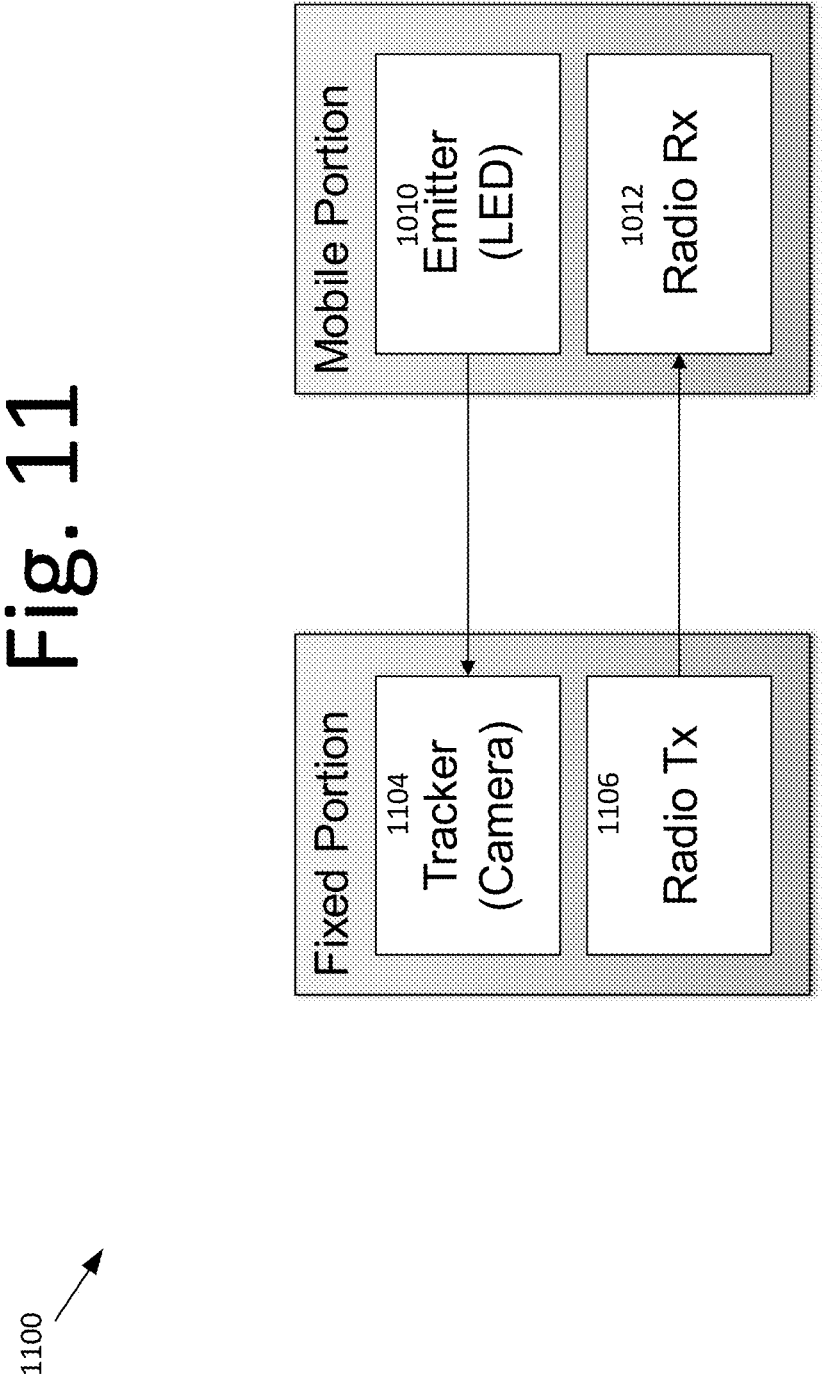

Similarly, the system may incorporate radios to complete the bidirectional data link. In such a system, a matched radio transmitter and radio receiver are used to complement the otherwise unidirectional link provided by certain embodiments of the present invention. FIG. 10 shows a transmitter 1006 sending signals to an optical receiver 1012, complemented by a radio transmitter 1010 sending signals to a radio receiver 1004. FIG. 11 shows an emitter 1010 sending signals to a tracker 1104, complemented by a radio transmitter 1106 sending signals to a radio receiver 1012. Operation of such radios should be readily understood by a person of ordinary skill in the art.

It should be appreciated that there may be a myriad of potential applications for the embodiments discussed herein. In one example, such as that shown in FIG. 5, hundreds of concert attendees (small dots) wearing wristbands are located within the field of view 504 of a ceiling-mounted tracker 502. In this example, each wristband contains an optical tracking emitter, a radio receiver, and a programmable multicolor LED. Tracker 502 determines the location of each emitter. A radio transmitter (not shown) then sends a command to each wristband's radio receiver. By transmitting different commands to each wristband, the LEDs for wristbands in each region can be commanded to a specific color. In FIG. 5, these colors and regions have been arranged so that, when viewed in the aggregate, the light from the plurality of wristbands forms the letter 'A'. Conversely, the radio transmitter could send the calculated position of each wristband, and the wristband could use that information determine the correct color, producing the same net effect. Commands can be sent to change colors by region directly, or to activate pre-arranged sequences; either mode can be used to create complex light shows or even full-motion video displays.

In another example, shown in FIG. 6, two trackers (or modulated projectors) 602$_1$ and 602$_2$ are mounted near a landing pad 606. An unmanned aerial vehicle 604, carrying an emitter, approaches landing pad 606 using a separate coarse navigation system (e.g., GPS), which is not accurate enough for a safe landing. However, once unmanned aerial vehicle 604 is in range of trackers 202$_1$ and 202$_2$, unmanned aerial vehicle 604 switches to the optical emitter, yielding very precise position estimates relative to landing pad 606, which allows final navigation to a safe landing. Such a system could also be used for landing pads that are only approximately fixed in location, such as a barge or ship.

FIG. 12 is a flow diagram illustrating a method 1200 for providing location-based commands to one or more tracking receivers. In some embodiments, method 1200 begins at 1202 with modulating a plurality of signals with a message. The message may include positioning information for any of the plurality of tracking receivers receiving the message, and the positioning information may identify a location of one or more tracking receivers able to receive that message.

Certain embodiments includes modulating each of the plurality of signals is modulated by a digital bit-stream, modulating each of the plurality of signals is modulated by on-off-keying or higher order modulation, or modulating each of the plurality of signals is modulated by a direct-sequence spread-spectrum code. Also, in some embodiments, the one or more modulated projector contains a light source modulated at a fixed carrier frequency.

At 1204, the plurality of modulated signals containing the message are broadcasted from one or more modulated projectors to the plurality of tracking receivers. In some embodiments, the message includes a set of instructions to cause the one of the plurality of devices to illuminate, where the illumination of the one of the plurality of devices is based on the position information. The set of instructions may also result in displaying of an image on another display unit separate from the plurality of receivers.

In an embodiment, an apparatus includes one or more modulated projectors configured to broadcast a plurality of signals to a plurality of tracking receivers. Each of the plurality of signals is modulated with a message. The message includes positioning information for any of the plurality of tracking receivers receiving the message. The positioning information identifies a location of one or more the tracking receivers able to receive that message.

In some embodiments, each of the plurality of tracking receivers is worn by a user or attached to an object.

Each of the plurality of signals is modulated by a digital bit-stream, by on-off-keying or higher order modulation, by a fixed carrier frequency, and/or by a direct-sequence spread-spectrum code. Furthermore, the each of the plurality of signals from the one or more projectors is distinguished by wavelength.

Also, in some embodiments, the one or more modulated projectors contain a light source modulated at a fixed carrier frequency.

In certain embodiments, the message includes a set of instructions to cause the one of the plurality of tracking receivers to illuminate. The illumination of the one of the plurality of tracking receivers is based on the position. The set of instructions issued to each of the plurality of tracking receivers also results in an LED illuminating, together forming an image.

In some additional embodiments, the positioning information is structured to allow vehicular navigation.

In yet another embodiment, two or more tracking receivers are attached to a single object, determining orientation and position. In those embodiments, a radio transmitter is used in conjunction with the optical receiver to allow bidirectional communication.

In an alternative embodiment, a method includes modulating a plurality of signals with a message. The message includes positioning information for any of the plurality of tracking receivers receiving the message. The positioning information identifies a location of one or more tracking receivers able to receive that message. The method also includes broadcasting the plurality of signals from one or more modulated projectors to the plurality of tracking receivers.

In some embodiments, the modulating of the plurality of signals further comprises modulating each of the plurality of signals by a digital bit-stream, modulating each of the plurality of signals by on-off-keying or higher order modulation, and/or modulating each of the plurality of signals by a direct-sequence spread-spectrum code.

In certain embodiments, the one or more modulated projectors contains a light source modulated at a fixed carrier frequency.

In some further embodiments, the message includes a set of instructions to cause one of the plurality of devices to illuminate. The illumination of the one of the plurality of devices is based on the position. Also, the set of instructions result in an illumination of a LED on each of the plurality of receivers, together forming an image.

In yet another embodiment, an apparatus includes one or more tracking cameras, and a plurality of emitters, each of which contain one or more modulated light source(s). The one or more tracking cameras are connected to one or more machine vision processors that detect and track the emitters.

In some embodiments, each of the plurality of emitters sends a time-varying signal uniquely identifying that emitter.

In some additional embodiments, each of the plurality of emitters sends a time-varying signal comprising sensor measurements or telemetry data, and are distinguished by wavelength.

Further, each of the plurality of emitters includes a light source, which is independently modulated in different wavelengths, and/or is amplitude-modulated to ensure the intensity is above zero.

Each of the one or more tracking cameras includes a wavelength-selected filter configured to reduce background interference and to enable higher order demodulation.

Further, each of the plurality of emitters incorporates more than one light source for higher order modulation or to ensure the intensity is above zero.

In some embodiments, the apparatus includes a radio transmitter used in conjunction with the one or more tracking cameras configured to allow bidirectional communication.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
at least two fixed tracking cameras, and
a plurality of independently movable modulated light emitters, each containing a data source and a modulated light source, each of the plurality of independently movable modulated light emitters are configured to transmit a modulated light signal comprising tracking information with respect to each of the plurality of independently movable modulated light emitters to the at least two fixed tracking cameras, wherein
the at least two fixed tracking cameras are connected to one or more machine vision processors detecting and tracking each of the plurality of independently movable modulate emitters, and
the at least two fixed tracking cameras are configured to perform three dimensional (3D) positioning of each of the plurality of independently movable modulated light emitters.

2. The apparatus of claim 1, wherein each of the plurality of emitters sends a time-varying modulated signal uniquely identifying an emitter from the plurality of emitters.

3. The apparatus of claim 2, wherein the data source is configured to generate the time-varying modulation signal,
the time-varying modulation comprising sensor measurements, telemetry data, or both.

4. The apparatus of claim 3, wherein the data source is configured to modulate a digital bit-stream in order to generate the time-varying modulation signal, the digital bit-stream containing information intended for the at least two fixed tracking cameras.

5. The apparatus of claim 1, wherein the data source is further configured to modulate the time-varying digital signal by performing an on-off-keying (OOK) in which a presence of light in a fixed time-interval indicates a binary '1' and an absence of the light indicates a binary '0'.

6. The apparatus of claim 1, wherein the data source is further configured to further modulate the time-varying digital signal with a carrier wave,
the carrier wave distinguishing a signal of interest from background sources and being an alternating on-off square waves or a pseudorandom sequence, using either frequency-hopped, direct sequence spread spectrum (DSSS) techniques, or both.

7. The apparatus of claim 1, wherein the modulated light source is configured to emit a light in relation to a time-varying modulation signal as a single wavelength or a fixed set of wavelengths.

8. An apparatus, comprising:
an optical tracking system comprising at least two tracking cameras; and
a plurality of independently movable modulated light emitters, each of which comprise a data source and a modulated light source, each of the plurality of independently movable modulated light emitters are configured to transmit a modulated light signal comprising tracking information with respect to each of the plurality of independently movable modulated light emitters to the optical tracking system, wherein
the data source is configured to generate a time-varying modulation signal uniquely identifying a corresponding one of the plurality of independently modulated light emitters, the modulated light source is configured to emit a light in relation to the time-varying modulation signal to the optical tracking system, and the at least two fixed tracking cameras are configured to perform three dimensional (3D) positioning of each of the plurality of independently movable modulated light emitters.

9. The apparatus of claim 8, wherein the data source inserts telemetry into the time-varying modulation signal.

10. The apparatus of claim 8, wherein the data source is further configured to modulate a digital bit-stream in order to generate the time-varying modulation signal, the digital bit-stream containing information intended for the optical tracking system.

11. The apparatus of claim 8, wherein the data source is further configured to modulate the time-varying digital signal by performing an on-off-keying (OOK) in which a presence of light in a fixed time-interval indicates a binary '1' and an absence of the light indicates a binary '0'.

12. The apparatus of claim 8, wherein the data source is further configured to further modulate the time-varying digital signal with a carrier wave, the carrier wave distinguishing a signal of interest from background sources and being an alternating on-off square waves or a pseudorandom sequence, using either frequency-hopped, direct sequence spread spectrum (DSSS) techniques, or both.

13. The apparatus of claim 8, wherein the modulated light source is further configured to emit a light in relation to the time-varying modulation signal as a single wavelength or a fixed set of wavelengths.

14. The apparatus of claim 8, wherein the optical tracking system comprises a plurality of cameras arranged to provide coverage over a pre-determined area of interest.

15. The apparatus of claim 14, wherein each of the plurality of cameras feeds a video signal to a software based machine vision processor.

16. The apparatus of claim 15, wherein the software based machine vision processor is configured to detect the light emitted from the time-varying modulated light source, enabling a plurality of tracking units to follow motion of the time-varying modulated light source over time.

17. The apparatus of claim 16, wherein each of the plurality of tracking units are configured to determine a time-varying intensity from the time-varying modulated light source.

18. The apparatus of claim 17, further comprising:
a plurality of demodulators, each of which correspond to one of the plurality of tracking units, and are configured to decode the time-varying modulated light source, identifying a corresponding one of the plurality of emitters.

19. A system for performing real-time position tracking, comprising:
at least two trackers configured to receive a time-varying modulated light signal identifying one of a plurality of independently movable light emitters, wherein
each of the plurality of trackers comprise
a plurality of tracking units configured to determine the time-varying modulated signal from the one of the plurality of independently movable light emitters, and
a plurality of demodulators configured to decode the time-varying modulated signal recovering an original bit-stream to identify the one of the plurality of independently movable light emitters, and
the at least two trackers are configured to perform three dimensional (3D) positioning of each of the plurality of independently movable modulated light emitters.

20. The system of claim 19, wherein each of the plurality of tracking units determine a location of a corresponding one of the plurality of emitters within the field of view of one of a plurality of cameras.

\* \* \* \* \*